United States Patent [19]

Yoneda et al.

[11] Patent Number: 5,471,305
[45] Date of Patent: Nov. 28, 1995

[54] ALIGNMENT VERIFICATION SYSTEM FOR USE WITH INTERFEROMETER AND HAVING A LINE SENSOR

[75] Inventors: Masami Yoneda; Toshikazu Akaogi, both of Omiya, Japan

[73] Assignee: Fuji Photo Optical Co., Ltd., Omiya, Japan

[21] Appl. No.: 278,842

[22] Filed: Jul. 22, 1994

[30] Foreign Application Priority Data

Jul. 23, 1993 [JP] Japan .................. 5-202087

[51] Int. Cl.$^6$ ........................ G01B 9/02
[52] U.S. Cl. ................... 356/363; 356/359
[58] Field of Search ................. 356/345, 363, 356/359, 360

[56] References Cited

U.S. PATENT DOCUMENTS 4,201,473  5/1980  Domenicali et al. ............ 356/360
5,054,925  10/1991  Hunter ....................... 356/363

*Primary Examiner*—Samuel A. Turner
*Assistant Examiner*—Robert Kim
*Attorney, Agent, or Firm*—Oblon, Spivak, McClelland, Maier & Neustadt

[57] ABSTRACT

An alignment verification system for adjusting the posture of a test piece on a support table into alignment with a reference plate on an interferometer containing a light source to irradiate the test piece and reference plate, the verification system including: a bi-axial adjustment means for tilting the support table in the directions of perpendicularly intersecting X- and Y-axis; spot image forming means arranged to converge light reflections from a master surface of the reference plate and an inspecting surface of the test piece into spot images of a predetermined diameter at a predetermined spot image-forming plane; a line sensor located at the spot image-forming plane across the spot image of the reference plate and having a linear light receiving face switchable through 90° between an X-axis position and a Y-axis position corresponding to the directions of the X- and Y-axes of the bi-axial adjustment means, for detecting the spot image of the test piece in relation with tilting adjustments of the support table by the bi-axial adjustment mechanism in each of the X- and Y-axis positions; and a sensor drive mechanism adapted to switch the light receiving face of the line sensor from the X-axis position to the Y-axis position or vice versa upon detecting the spot image of the test piece in one of the X- and Y-axis positions.

6 Claims, 6 Drawing Sheets

ALIGNMENT VERIFICATION SYSTEM FOR USE WITH INTERFEROMETER AND HAVING A LINE SENSOR

BACKGROUND OF THE INVENTION

1. Field of the Art

This invention relates generally to interferometers which are used for inspecting surface conditions or surface configurations of optical lenses or other precision optical elements by way of interference fringes, and more particularly to an alignment verification system to be used with an interferometer for adjusting a test piece under interferometric inspection into an aligned state with respect to the optical axis of a reference member on the part of the interferometer.

2. Prior Art

For inspecting machining accuracy, for example, of an optical precision element (hereinafter referred to simply as "test piece" for brevity) by the use of an interferometer, it is the usual practice for the interferometer to employ a laser light source, diverging the light rays from the laser light source into a flux of a predetermined diameter through a diverging lens and passing the light flux through a collimator lens to form parallel light rays to be shed on a reference member with a model or prototype surface (hereinafter referred to as "a master surface") for the test piece to be inspected. The parallel light rays are partly reflected on and partly transmitted through the reference member. The transmitted light rays from the reference member are reflected on the inspecting surface of a test piece to go back together with the light reflection from the reference member, along a path which is turned through 90° toward an observation means where the wave surfaces of the two light reflections are superposed one on the other to observe the interference fringes resulting from interference of the two superposed wave faces, assessing the surface condition of the test piece under inspection by way of the number and shape of the interference fringes.

In this connection, the light path from the laser light source to the reference member as well as the light path from the reference member to an image pickup means, which serves to form an image of interference fringes, is built into a housing of the interferometer with the components of the respective light paths preadjusted in precisely aligned state. However, each one of the test pieces, which need to be replaced one after another for successive inspection, is normally set in position on a support means outside the interferometer housing. Therefore, each time a test piece is set on the outer support means, there arises a necessity for fine adjustments for bringing the optical axis of the test piece on the support means exactly into alignment with that of the reference member on the side of the interferometer. In this regard, it has been the usual practice to mount the support means for the test piece on an adjustment stage which is capable of three-dimensional adjustments, namely, capable of adjusting the position of the support means in horizontal directions as well as in tilting directions.

Nevertheless, there is no guarantee that a test piece is set strictly in a predetermined position or posture on the support means no matter whether it is set by a manual operation or automatically by the use of a pick and place means. For instance, a positioning mechanism to be provided in association with the outer support means is normally arranged and operated on the basis of the outer shape of the test piece, and invariably needs adjustments depending upon the particular shape of the test piece to be inspected. Precise positioning of test pieces based on their outer shape becomes difficult especially in case they have a relatively large dimensional tolerance in outer configuration. Besides, accurate inspection and measurement are rendered impossible if a test piece is in a misaligned state relative to the reference member on the side of the interferometer. Therefore, the support means is usually provided with an alignment system thereby to bring each test piece on the support means into alignment with the reference member. A typical alignment system includes a bi-axial adjustment mechanism for tilting the support means in the directions of perpendicularly intersecting X- and Y-axes together with a test piece, which is set on the support means, in combination with an alignment verification means including a conversion lens to converge light reflections from the reference member and test piece into spot images of a predetermined diameter on a predetermined plane. The test piece on the support means is adjusted into an aligned position relative to the reference member by operating the bi-axial adjustment mechanism in the X- and Y-axis directions in such a way that the spot image of the reflected light from the test piece is superposed exactly on the spot image of the reflected light from the reference member.

In bringing the optical axis of a test piece into alignment with that of the reference member by way of the two spot images, the bi-axial adjustment mechanism needs to be operated according to detected positional deviations between the two spot images. In this regard, it has been the conventional practice in the art to employ a TV camera for capturing the test piece spot image and the reference spot image, detecting the position of the test piece spot image by means of a coordinate detection system having its origin at the position of the reference spot image, and operating the bi-axial adjustment mechanism according to the detected positional signal in a direction of zeroizing the positional deviation of the test piece spot image from the reference spot image. What is required here is to operate an adjustment mechanism in such a way that the test piece spot image is shifted toward and superposed on the reference spot image which is at a fixed position. The adjustments of this sort, however, can be attained without resorting to a costly and complicate detection system using a TV camera in combination with a coordinate detector.

SUMMARY OF THE INVENTION

It is an object the present invention to provide an inexpensive alignment verification means which is simple in construction and yet capable of bringing a test piece on an outer support table accurately into alignment with a reference member on an interferometer.

In accordance with the present invention, the above-stated objective is achieved by the provision of an alignment verification system for adjusting the posture of a test piece on a support table into alignment with a reference plate on an interferometer containing a light source to irradiate the test piece and the reference plate, the alignment verification system including: a bi-axial adjustment means for tilting the test piece on the support table in the directions of perpendicularly intersecting X- and Y-axis; spot image forming means arranged to converge light reflections from a master surface of the reference plate and an inspecting surface of the test piece into spot images of a predetermined diameter at a predetermined spot image-forming plane; a line sensor located at the spot image-forming plane across the spot image of the reference plate and having a linear light receiving face switchable through 90° between an X-axis position and a Y-axis position corresponding to the directions of the X- and Y-axes of the bi-axial adjustment means, for detecting the spot image of the test piece in relation with tilting adjustments of the support table by the bi-axial adjustment mechanism in each of the X- and Y-axis positions; and a sensor drive mechanism adapted to switch the light receiving face of the line sensor from the X-axis position to the Y-axis position or vice versa upon detecting the spot image of the test piece in one of the X- and Y-axis positions.

The spot images of light reflections from the master surface of the reference member and the inspecting surface of the test piece, i.e., a reference spot image and a test piece spot image, are formed on the plane where the line sensor is located. Since the reference member and the spot image forming means are provided within an interferometer housing, the reference spot image is formed constantly at a predetermined position. In this regard, in a preferred embodiment of the invention, the light receiving face of the line sensor is located across the reference spot image and, when switching its position, turned about an axis located in a position which coincides with the reference spot image. On the other hand, the test piece spot image is formed randomly at a certain position on the plane which contains the line sensor. While the sensor is located at a predetermined position across the reference spot image, the bi-axial adjustment mechanism is operated to displace the test piece spot image toward the sensor. Therefore, when the test piece spot image is captured by the sensor in one sensor position, it means that the test piece spot image is now brought into alignment with the reference spot image on one of X- and Y-axes which perpendicularly intersect each other at the point of the reference spot image. Nextly, the linear light receiving face of the sensor is turned through 90° into the other position in the direction of the other axis, and in this state the test piece spot image is shifted in a direction perpendicular to the line sensor by operation of the bi-axial adjustment mechanism. Namely, the test piece spot image is shifted toward the sensor until it is captured by the latter. As a result, the test piece spot image is aligned with the reference spot image on the other axis through the reference spot image. That is to say, the two spot images are located in the same position on the two perpendicularly intersecting axis, verifying that the test piece on the support table is now in alignment with the reference member on the interferometer.

BRIEF DESCRIPTION OF THE DRAWINGS

The above and other objects, features and advantages of the invention will become apparent from the following description taken in conjunction with the accompanying drawing which show by way of example some preferred embodiments of the invention and in which.

DESCRIPTION OF PREFERRED EMBODIMENTS

Figure 1:
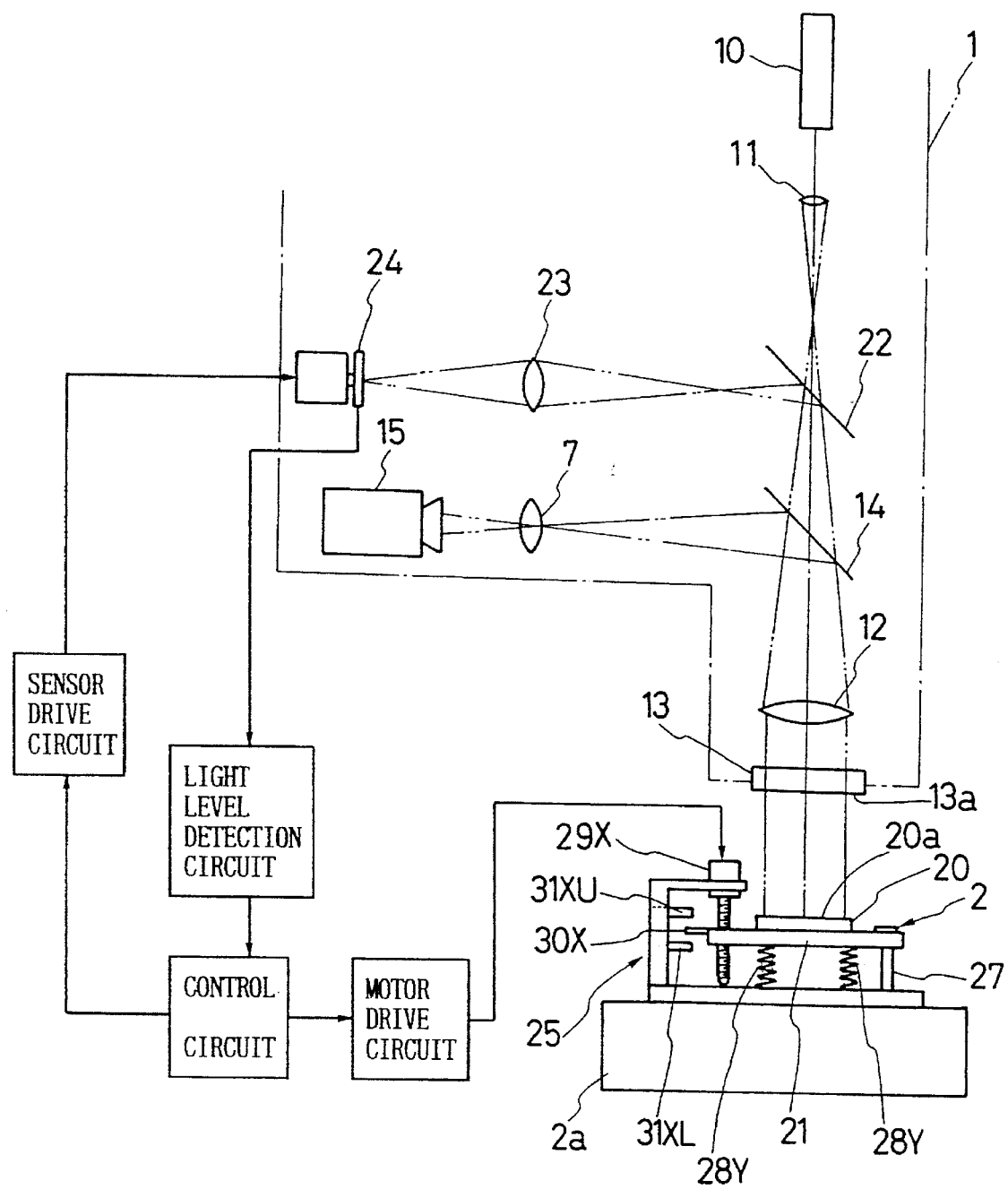
FIG. 1 is a schematic view illustrating the general configuration of an interferometer including an alignment verification system according to the invention.

Hereafter, the invention is described more particularly by way of its preferred embodiments shown in the drawings Referring first to FIG. 1, there is illustrated the general configuration of an interferometer system including an alignment verification system according to the present invention, in which indicated at 1 is an interferometer and at 2 is a test piece mount unit. The interferometer 1 includes a laser light source 10, the laser light emitted from the laser light source 10 being diverged through a divergent lens 11 and then collimated into parallel light rays through a collimator lens 12. The parallel light rays from the collimator lens 12 are shed on a reference plate 13 and partly reflected on a master surface 13a of the reference plate 13. The light which has passed through the reference plate 13 is shed on a test piece 20, which is set on a test piece mount table 2, and partly reflected on an inspecting surface 20a of the test piece 20. A half mirror 14 is located between the collimator lens 12 and the divergent lens 11 to turn the light reflections from the master surface 13a of the reference plate 13 and the inspecting surface 20a of the test piece 20 toward an interference fringe image pickup means 15 such as a TV camera or the like through an imaging lens 7 thereby to pick up the image of interference fringes of the two superposed light reflections. In this instance, the test piece 20 is set on a support table 21 on the test piece mount unit 2 which has its own mechanisms separately and independently of the interferometer 1. Therefore, the support table 21 itself needs to be preadjusted into a predetermined aligned position relative to the interferometer 1. For this purpose, the test piece mount unit 2 is provided with an adjustment stage 2a which is capable of adjusting the support table 21 in horizontal directions and in tilting directions relative to the interferometer 1.

In order to form an image of interference fringes on the image pickup means 15, it is mandatory that the inspecting surface 20a of the test piece 20 and the master surface 13a of the reference plate 13 be held in predetermined positional relationship with each other. In this regard, the support table 21 itself can be adjustably held in a predetermined position relative to the interferometer as mentioned hereinbefore. However, each of test pieces 20, which are replaceably set on the support table 21 one after another for successive inspection, involves a strict adjustment for alignment with the reference plate 13, which is often found extremely difficult. This problem is suitably solved by the alignment verification system of the present invention, which permits to bring the test piece 20 on the support table 21 into alignment with reference plate 13 in a simplified manner by the use of inexpensive means. The alignment verification system is arranged to bring the test piece 20 into alignment with the reference plate 13 by operating a bi-axial adjustment mechanism in relation with spot images of light reflections from the master surface 13a of the reference plate 13 and the inspecting surface 20a of the test piece 20, tilting the support table 21 of the test piece 20 in such a way that the spot image of the test piece 20 is shifted to the same position as the reference spot image on two perpendicularly intersecting axes. These spot images are formed by optical means including a second half mirror 22 and a condensing lens 23. The second half mirror 22 is located, for example, between the divergent lens 11 and the half mirror 14 to transmit therethrough the light from the laser light source 10 while reflecting the return light rays from the master surface 13a of the reference plate 13 and the inspecting surface 20a of the test piece 20. The reflected light rays from the second half mirror 22 are converged into spot images on a predetermined spot image-forming plane of the condensing lens 23, which contains a line sensor 24 and which is disposed perpendicularly to the optical axis of the spot image-forming optical system. Thus, a couple of spot images, a reference spot image and a test piece spot image, are formed on that plane.

Figure 2:
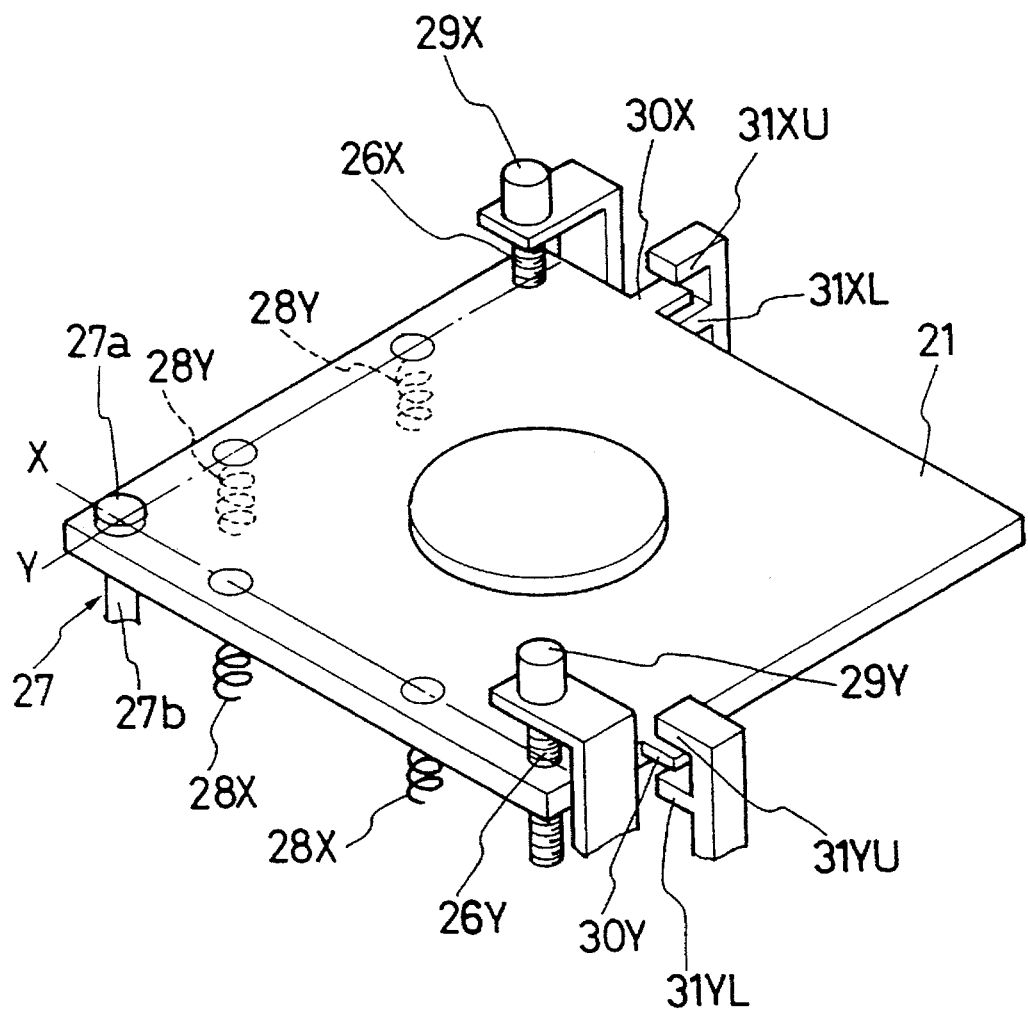
FIG. 2 is a schematic view explanatory of the construction of a test piece mount unit.

Now, in order to shift the test piece spot image toward a position which coincides with the reference spot image, the support table 21 is mounted on a bi-axial adjustment means 25 which is capable of tilting the support table 21 to adjust the posture of the test piece 20. As illustrated in FIG. 2, the bi-axial adjustment means 25 includes a couple of adjustor screws 26X and 26Y which are threaded into diagonally opposite corner portions of the support table 21 in association with two adjacently adjoining sides thereof, and a fulcrum pin member 27 which is fitted in the support table 21 in a corner portion between the adjuster screws 26X and 26Y. The support table 21 is disposed in free state at the remaining corner portion which diagonally opposes the fulcrum pin member 27. The just-mentioned fulcrum pin member 27 is provided with a larger-diameter head portion 27a which is abutted against the top surface of the support table 21, and a smaller-diameter shank portion 27b which is loosely fitted in the support table 21. Springs 28X are interposed at spaced positions along a line (X-axis) which extends through the fulcrum pin 27 and the adjuster screw 26Y while springs 28Y are interposed at spaced positions along a line (Y-axis) which extends through the fulcrum pin 27 and the adjuster screw 26X, thereby constantly pushing the support table 21 upward. The adjustor screws 26X and 26Y are connected to motors 29X and 29Y, respectively, which rotationally drive the respective adjuster screws when tilting the support table 21. More specifically, upon actuating the motor 29X, the support table 21 is rocked about the X-axis extending through the fulcrum pin 27 and the adjuster screw 26Y compressing the springs 28X, and, upon actuating the other motor 29Y, the support table 21 is rocked about the Y-axis extending through the fulcrum pin 27 and the adjuster screw 26X compressing the springs 28Y. Indicated at 30X and 30Y are detection tab members which are provided on the support table 21 in association with limit switches 31XU and 31XL or limit switches 31YU and 31YL which are turned on by abutting engagement with the detection tab member 30X or 30Y to delimit the rocking movement of the support table 21 at a predetermined upper or lower limit position at the time of tilt adjustment.

Figure 3:
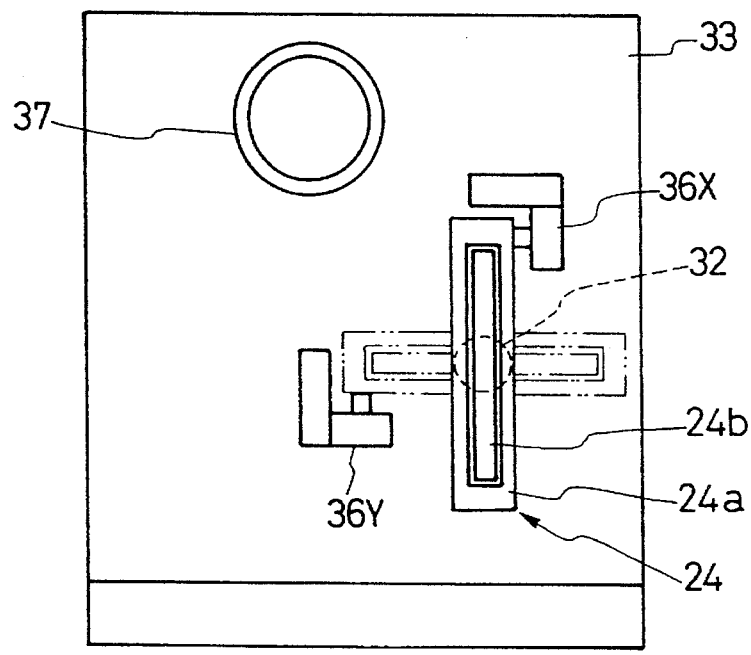
FIG. 3 is a schematic outer view of a line sensor unit.
Figure 4:
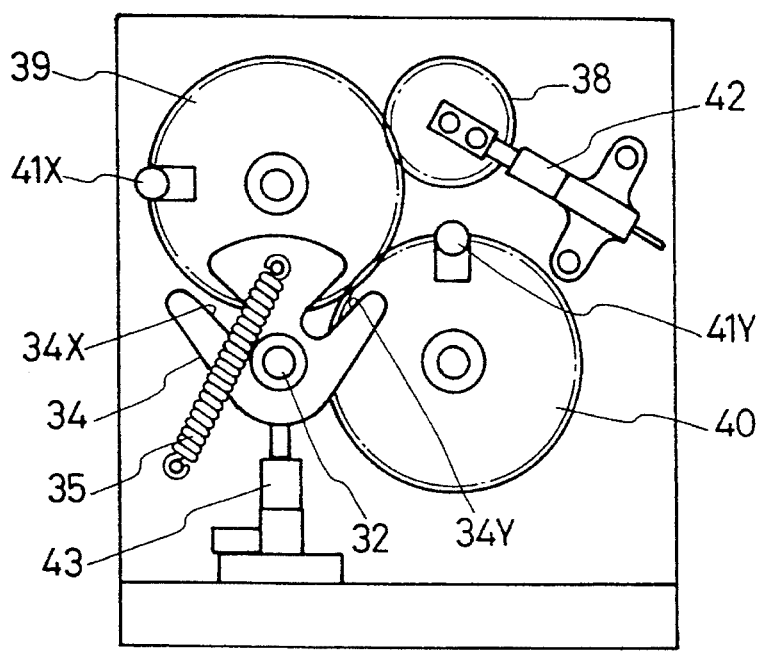
FIG. 4 is a schematic view illustrating the arrangements of a line sensor drive mechanism.
Figure 5:
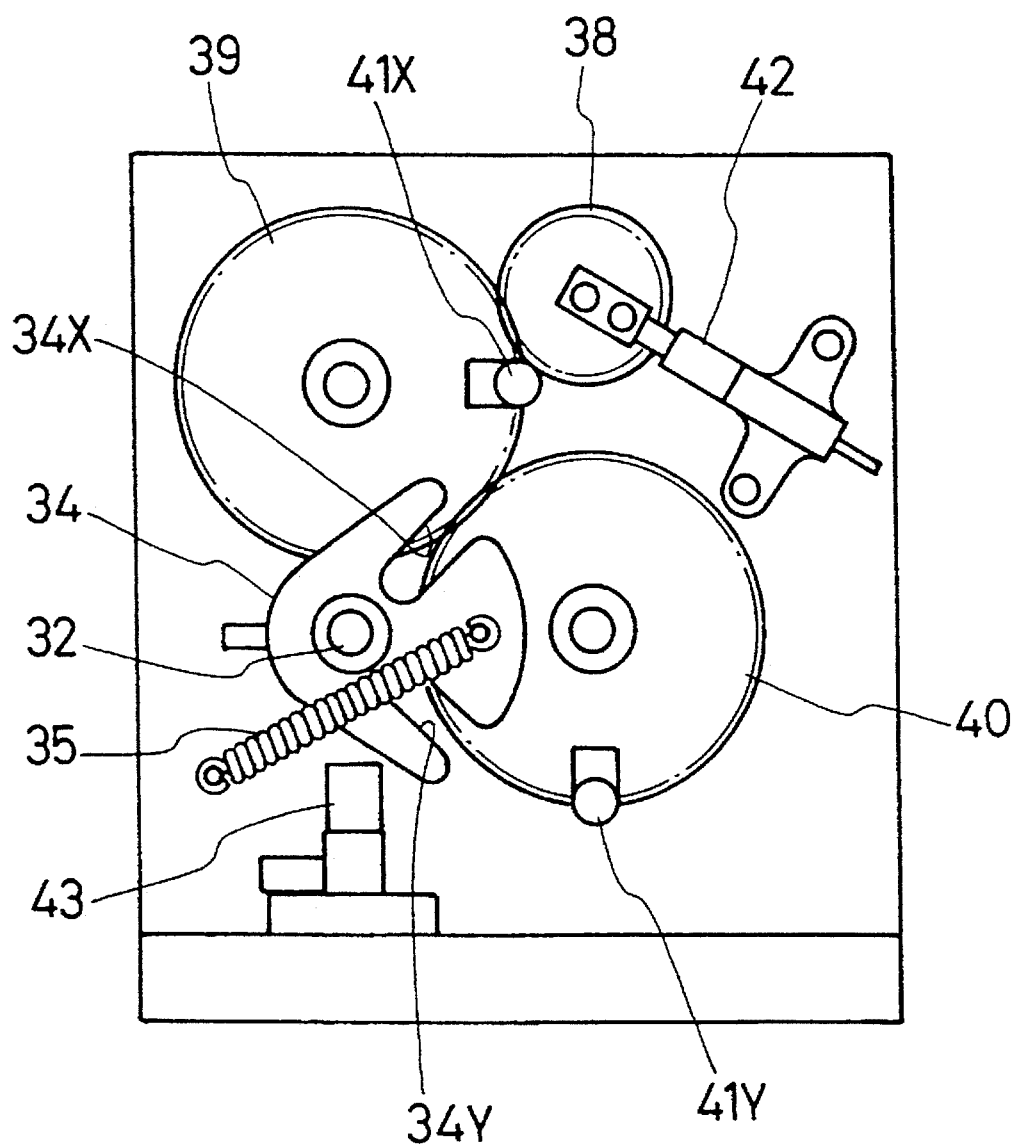
FIG. 5 is a schematic view of the line sensor mechanism in an operational phase different from FIG. 4.

The line sensor 24 is turnable through 90° to switch its position in the above-mentioned spot image-forming plane. More specifically, as shown in FIG. 3, the line sensor 24 has a light receiving portion 24b mounted on a turnable substrative plate 24a. The substrative plate 24a is coupled with a rotational shaft 32 which is rotatably supported in and extended through a front plate 33 and connected to the rear side of the substrative plate 24a of the line sensor 24. As shown in FIGS. 4 and 5, a cam plate 34 is fixedly mounted on the rotational shaft 32, the cam plate 34 being formed with a couple of cam grooves 34X and 34Y and connected to the front plate 33 through a tension spring 35. The tension spring 35 is stretched to a maximum degree at a dead center position on the axis of the rotational shaft 32, and acts to bias the cam plate 34 in one direction when the cam plate 34 is turned either in the leftward or rightward direction from its dead center position. A couple of stoppers 36X and 36Y are provided on the front side of the front plate 33 thereby to stop and hold the line sensor 24 either in an X-axis position (the position of FIG. 4) in abutting engagement with the stopper 36X or in a Y-axis position (the position of FIG. 5) in abutting engagement with the stopper 36Y. Thus, the tension spring 35 has its dead center position at an intermediate point between the X- and Y-axis positions of the line sensor 24, and serves to hold the line sensor 24 in one of predetermined operating positions by urging same into abutting engagement with the stopper 36X when in the X-axis position in the direction of the X-axis or with the stopper 36Y when in the Y-axis position in the direction of the Y-axis.

A drive motor 37 is mounted on the front plate 33 for switching the line sensor 24 between the X-axis position in the direction of the X-axis and the Y-axis position in the direction of the Y-axis. Coupled with the drive motor 37 is a drive gear 38 which is meshed with a first gear 39 which is in turn meshed with a second gear 40. In this instance, the drive gear 38 has a gear ratio of ½ to the first and second gears 39 and 40, so that one revolution (a 360° turn) of the drive gear 38 causes half revolutions (180° turns) of the first and second gears 39 and 40. Provided on the first and second gears 39 and 40 are cam followers 41X and 41Y which are engageable in the cam grooves 34X and 34Y of the cam plate 34, respectively. Therefore, the cam plate 34 is rotatable back and forth through 90° about the rotational shaft 32. The reference numeral 42 indicates a motor position detection means which detects the original point of the drive gear 38, and the reference numeral 43 indicates a sensor position detection means which detects whether or not the line sensor 24 is in the X-axis position in the direction of the X-axis.

In the present embodiment with the above-described arrangements, a test piece 20 is placed on the support table 21 of the test piece mount unit 2 in face to face relation with and at a predetermined space from the reference plate 13 on the interferometer 1, and a laser beam is emitted from the laser light source 10. Part of the laser light is reflected on the master surface 13a of the reference plate 13, and part of the light which has been transmitted through the reference plate 13 is reflected on the inspecting surface 20a of the test piece 20. The image of interference fringes, which are produced by interference of the overlapped wave surfaces of the light reflections from the master surface 13a and the inspecting surface 20a, is formed on the image pickup means 15 for inspection of the condition or the accuracy of finish of the inspecting surface 20a of the test piece 20.

For accuracy of inspection, it is a paramount requisite for the test piece 20 to be set correctly on the support table in an aligned state, i.e., with the perpendicular of the inspecting surface 20a exactly in alignment with the center axis of the reference plate 13. Therefore, it invariably becomes necessary to make adjustments and verify the alignment of the two center axis prior to inspection of each test piece. To verify their alignment, the half mirror 14 is receded to a position outside the path of the laser light from the laser light source 10, and instead the second half mirror 22 is advanced to an operating position in the laser light path. As a result, the laser light is reflected partly on the master surface 13a of the reference plate 13, and the laser light which has been transmitted through the second half mirror 22 is partly reflected on the test piece 20. These light reflections are turned by reflection on the second half mirror 22 toward the condenser lens 23 to form spot images of the respective light reflections at a predetermined plane. The alignment of the test piece 20 with the reference plate 13 is verified by way of the spot image T of the reflected light from the inspecting surface 20a, which is superposed on the spot image S of the reflected light from the master surface 13a when the test piece 20 is brought into aligned state.

The line sensor 24 is located on the same plane as the above-mentioned spot images S and T. The light path of the incident laser light from the laser light source 10 to the reference plate 13 and the light path of the reflected light from the reference surface 13a of the reference plate 13 to the line sensor 24 are built in the interferometer 1, in such a way that the spot image S of the light reflection from the master surface 13a is formed on the rotational axis at the center of the line sensor 24. On the other hand, since the test piece 20 is set on the test piece mount unit 2 which is built and installed separately from the interferometer unit 1, the spot image T is not necessarily formed on the rotational axis at the center of the line sensor 24. However, the position of the support table 21 itself is preadjusted relative to the interferometer unit 1 by way of the adjustment stage 2a, so that there is no possibility of the spot image T being largely deviated from the spot image S as long as the test piece 20 is set in a predetermined position on the support table 21. Therefore, the line sensor 24 is preferably of a size which can cover the maximum possible deviations of the spot image T.

Alignment of the test piece 20 is achieved by shifting the spot image T to a position which registers on spot image S at the center of the line sensor, in the manner as described below with reference to the block diagram of FIG. 1.

Measurement of surface conditions of a test piece 20 is started upon setting same on the support table 21, which is detected through a sensor, or by operating a start means on a control panel. The resulting start signal is fed to a control circuit 51 to start adjustments for alignment of the test piece 20. More specifically, an alignment execution signal is fed to a sensor drive circuit 52 from the control circuit 51 to set the light receiving portion 24b of the line sensor 24 in the X-axis position (the position of FIG. 4) in the direction of the X-axis. In this regard, as described hereinbefore, the cam plate 34 which switches the position of the line sensor 24 is provided with the sensor position detection means 43. Therefore, when the signal from the sensor position detector 43 indicates that the light receiving portion 24b of the line sensor 24 is already in the X-axis position, the cam plate 34 remains in de-actuated state to retain the line sensor 24 in that position. In case the output signal of the sensor position detector 43 indicates that the line sensor 24 is in the Y-axis position (the position of FIG. 5), the drive motor 37 is actuated to turn the drive gear 38 for one full revolution or through 360°. As a result, the first and second gears 39 and 40 are each caused to make a half turn, bringing the cam follower 41X on the second gear 40 into engagement with the cam groove 34X of the cam plate 34 to turn the light receiving portion 24b of the line sensor 24 into the direction of the X-axis.

Figure 6:
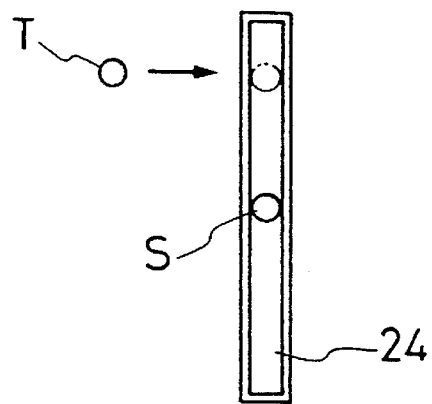
FIG. 6 is a schematic illustration of spot images being brought into alignment with each other on one axis.

Simultaneously, the laser light source 10 is lit on to irradiate the reference surface 13a of the reference plate 13 and the inspecting surface 20a of the test piece 20, while forming spot images S and T of light reflections from the reference surface 13 and the inspecting surface 20a on the plane which contains the line sensor 24. At this time, although the reference spot image S is invariably formed on the rotational axis at the center of the light receiving portion 24b of the line sensor 24, the test piece spot image T could be formed at a deviated position outside the light receiving portion 24b of the line sensor 24. Therefore, the aforementioned alignment execution signal from the control circuit 51 is also fed to a motor drive circuit 53. According to this signal, the motor 29X is actuated to tilt the support table 21 in the direction of the X-axis. Consequently, the spot image T is displaced in the direction of the X-axis relative to the line sensor 24. By this relative displacement, the spot image T is shifted in the arrowed direction in FIG. 6 until it is captured by the line sensor 24. The capturing of the spot image T results in a distinct increase in the level of light acceptance by the line sensor 24 increases, and this increase in light acceptance is detected by a light acceptance detector circuit 54. At this point, the test piece spot image T is located at a position in alignment with the reference spot image S on the X-axis which extends through the reference spot image S, including a case where the test piece spot image T is directly superposed on the reference spot image S on the X-axis.

Then, the control circuit 51 sends out a signal to the sensor control circuit 52 to actuate the drive motor 37 for one full revolution of the drive gear 38. As a result, the first and second gears 39 and 40 are respectively turned through 180°, bringing the cam follower 41Y on the second gear 40 into engagement with the cam groove 34Y of the cam plate 34 to turn same. The cam follower 41Y is disengaged from the cam groove 34Y as soon as the cam plate 34 is turned past the dead center position of the tension spring 35, which then exerts a tensile biasing force on the cam plate 34 in the direction of rotation. Therefore, the line sensor 24 which is connected to the cam plate 34 through the rotational shaft 32 is turned with the latter until its substrate 24a is abutted against the stopper 36Y, and retained in the Y-axis position with its light receiving portion 24b in the direction of the Y-axis.

Figure 7:
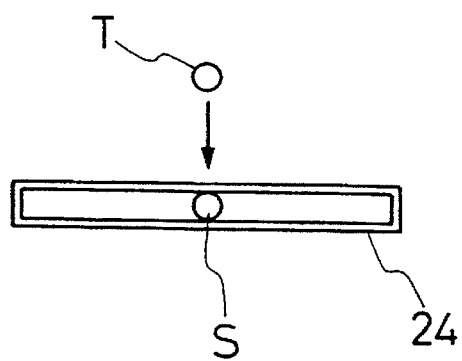
FIG. 7 is a view similar to FIG. 6 but showing the two spot images being brought into alignment with each other on the other axis.

As soon as the drive gear 38 completes one revolution, this is detected by the motor position detector 42, and a signal from the motor position detector 42 is sent to the control circuit 51 to stop the drive motor 37. At the same time, the drive circuit 51 supplies the motor drive circuit 53 a drive signal for the motor 29Y thereby to tilt the support table 21 about the Y-axis. As the support table 21 is tilted about the Y-axis by actuation of the motor 29Y, the test piece spot image T is shifted in the arrowed direction in FIG. 7 until it is captured by the light receiving portion 24b of the line sensor 24. The capturing of the test piece spot image T also results in a distinct variation in the level of light acceptance by the light receiving portion 24b of the line sensor 24, and this variation is detected by the light acceptance level detector circuit 54 to produce an alignment signal. Upon receipt of this alignment signal, the control circuit 51 supplies a motor stop signal to the motor drive circuit 53 to stop the motor 29Y. As a consequence, the test piece spot image T which had been aligned with the reference spot image S on the X-axis in the previous X-axis adjustment is now aligned with the latter also on the Y-axis. That is to say, the test piece spot image T is completely overlapped on the reference spot image S, verifying alignment of the test piece 20 with the reference plate 13 and permitting to start the inspection of the surface conditions of the test piece 20 on the support table 21 by way of interference fringes. The inspection of the test piece 20 can be carried out correctly because the path of reflected light from the inspecting surface 20a of the test piece 20 is now precisely in alignment with the path of reflected light from the master surface 13a of the reference plate 13, which is preadjusted in alignment with the image pickup means 15.

Thus, the alignment verification system according to the invention involves simple mechanisms employing a line sensor 24 with a rotational switching mechanism for turning the line sensor 24 back and forth through 90°, in addition to the advantage that the verification system can be operated by simple control means as compared with a combination of a TV camera and a coordinate detection mechanism which are costly and require a complicate control system. In this connection, the light acceptance level detector circuit 54 is arranged to operate according to a preset threshold value corresponding to a median point between the light acceptance level in a non-aligned phase having the reference spot image S alone on the line sensor 24 and the light acceptance level in an aligned phase having both of the reference spot image S and the test piece spot image T on the line sensor 24, producing a stop signal to halt a tilting movement of the support table 21 at a time point when the light acceptance level of the line sensor 24 exceeds the threshold value. In case the laser light source 10 is of stabilized wavelength type, the above-mentioned threshold value may be a fixed value. In other cases, however, the level of the incident laser light could gradually vary as time lapses due to changes in ambient temperature or other factors even in a stabilized period well after turning on the laser source. This problem can be solved by reading the light acceptance level of the reference spot image S alone prior to setting a test piece 20 on the support table 21 and adjusting the threshold value of the light acceptance level detector circuit 54 accordingly.

As the support table 21 is tilted in the direction of X- or Y-axis for capturing the test piece spot image T on the line sensor 24, the tilting direction is reversed in case a certain extent of tilting movement in one direction fails to capture the spot image T. In this regard, the tilting angle is delimited by the limit switches 31XU and 31XL and the limit switches 31YU and 31YL which determine the upper and lower limit positions of tilting movements in the direction of X- and Y-axes, respectively. Accordingly, a detection signal produced by any of the limit switches 31XU, 31XL, 31YU and 31YL can be used as a signal for reversing the direction of tilting movement. In case the line sensor 24 is unable to capture the test piece spot image T even after a reversal of the tilting movement, this means that the test piece 20 itself is set in a largely deviated position on the support table 21. In such a case, it is desirable to produce an error sign to indicate that the test piece 20 is outside an adjustable range.

Figure 8:
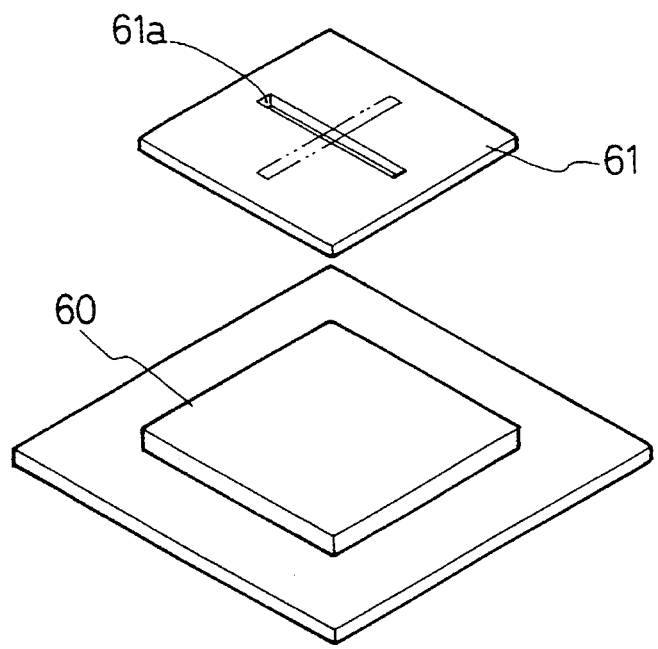
FIG. 8 is a schematic illustration of a line sensor of modified construction.
Figure 9:
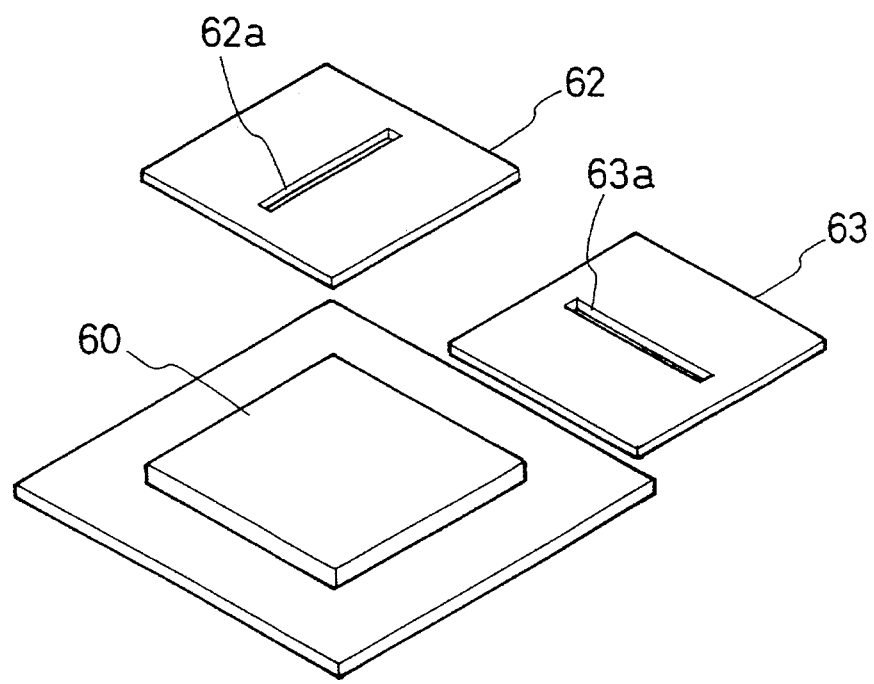
FIG. 9 is a schematic illustration of another line sensor of modified construction.

If desired, the line sensor may be arranged as illustrated in FIG. 8, employing an areal sensor 60 and a slit plate 61 which is provided with a slit 61a of predetermined width and length and placed on the face of the area sensor 60, the slit plate 61 being connected to a rotational drive means (not shown) for turning the direction of the slit 61a through 90°. Alternatively, the line sensor may employ a couple of slit plates 62 and 63 which are provided with slits 62a and 63a in perpendicularly intersecting directions and which are selectively placed on the areal sensor 60 to produce the same effects as the linear sensor 24 which is arranged to turn through 90° to switch its position.

As clear from the foregoing description, the alignment verification system according to the present invention includes a spot image forming means located in the path of light reflections from a master surface of a reference member on an interferometer and from an inspecting surface of a test piece on a adjustable support table to form a reference spot image and a test piece spot image at a predetermined plane, a bi-axial adjustment mechanism adapted to tilt the support table in the directions of perpendicularly intersecting X- and Y-axis to adjust the posture of the test piece on the support table, a line sensor located on the just-mentioned spot image-forming plane and rotatable back and forth through 90° about the reference spot image to assume either an X-axis position in the direction of the X-axis or a Y-axis position in the direction of the Y-axis, and a control means for operating the bi-axial adjustment means until the test piece spot image is captured by the line sensor in each of the X- and Y-axis positions of the line sensor, permitting to verify the alignment of the test piece with the reference plate on the interferometer by simple means without resorting to complicate and costly means like a combination of a TV camera and a complicate coordinate position detection system for computing positional deviations of the spot image on the image pickup plane of the TV camera. Namely, the present invention makes it possible to adjust a test piece into an aligned position for interferometric inspection by the use of a simple verification means which can be operated by a simple control means in shifting a spot image of the test piece to a position registering on a spot image of the reference plate on the interferometer.

What is claimed is:

1. An alignment verification system for adjusting the posture of a test piece on a support table into alignment with a reference plate on an interferometer including a light source to irradiate said test piece and reference plate, said verification system comprising:

a bi-axial adjustment means for tilting said test piece on said support table in the directions of perpendicularly intersecting X- and Y-axis; spot image forming means arranged to converge light reflections from a master surface of said reference plate and an inspecting surface of said test piece into spot images of a predetermined diameter at a predetermined spot image-forming plane;

a line sensor located at the spot image-forming plane across the spot image of the reference plate and having a linear light receiving face arranged to be switchable through 90° between an X-axis position and a Y-axis position corresponding to the directions of said X- and Y-axes of said bi-axial adjustment means, for detecting the spot image of said test piece in relation with tilting adjustments of said support table by said hi-axial adjustment mechanism in each of said X- and Y-axis positions; and a sensor drive mechanism adapted to switch said light receiving face of said line sensor from said X-axis position to said Y-axis position or vice versa upon detecting said spot image of said test piece in one of said X- and Y-axis positions.

2. An alignment verification system as defined in claim 1, wherein said line sensor is supported on a rotational shaft for rotation about an axis located on said spot image of said reference plate on said spot image-forming plane.

3. An alignment verification system as defined in claim 1, wherein said line sensor is constituted by a flat areal sensor and a slit plate turnably placed on said areal sensor for switching the direction of a slit through 90° between said X- and Y-axis positions.

4. An alignment verification system as defined in claim 1, wherein said line sensor is constituted by a flat areal sensor and a couple of slit plates containing slits in the directions of said X- and Y-axis, respectively, said slit plates being selectively placed on said areal sensor for switching the sensor position between said X- and Y-axis positions.

5. An alignment verification system as defined in claim 1, wherein said bi-axial adjustment means includes a couple of adjuster screws threaded into diagonally opposing corner portions of said support table for tilting same about said X- and Y-axes.

6. An alignment verification system as defined in claim 2, wherein said rotational shaft is connected to a drive motor through a cam and cam follower switch mechanism.

\* \* \* \* \*